United States Patent
Ichii et al.

(10) Patent No.: US 8,223,418 B2
(45) Date of Patent: Jul. 17, 2012

(54) OPTICAL SCANNING DEVICE AND IMAGE FORMING APPARATUS

(75) Inventors: Daisuke Ichii, Kanagawa (JP); Makoto Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 322 days.

(21) Appl. No.: 12/365,727

(22) Filed: Feb. 4, 2009

(65) Prior Publication Data

US 2009/0195849 A1    Aug. 6, 2009

(30) Foreign Application Priority Data

Feb. 5, 2008   (JP) ................. 2008-024681

(51) Int. Cl.
 *G02B 26/08* (2006.01)
 *G02B 26/10* (2006.01)
 *G02B 26/12* (2006.01)

(52) U.S. Cl. ............... 359/205.1; 359/212.2; 359/216.1

(58) Field of Classification Search ..... 359/196.1–226.3
 See application file for complete search history.

(56) References Cited

U.S. PATENT DOCUMENTS

| | | | |
|---|---|---|---|
| 5,477,372 A * | 12/1995 | Ota ............... | 359/205.1 |
| 5,808,774 A * | 9/1998 | Kawabata ............. | 359/210.1 |
| 5,815,301 A * | 9/1998 | Naiki et al. ........... | 359/205.1 |
| 6,509,995 B1 | 1/2003 | Suzuki et al. | |
| 6,804,064 B2 | 10/2004 | Hirakawa et al. | |
| 6,829,102 B2 | 12/2004 | Ohashi et al. | |
| 7,218,432 B2 | 5/2007 | Ichii et al. | |
| 7,385,181 B2 | 6/2008 | Miyatake et al. | |
| 7,417,777 B2 | 8/2008 | Saisho et al. | |
| 2002/0114051 A1 | 8/2002 | Atsuumi | |
| 2002/0191304 A1 * | 12/2002 | Kitaoka et al. ........ | 359/687 |
| 2003/0189743 A1 * | 10/2003 | Nakai ............... | 359/204 |
| 2005/0128549 A1 * | 6/2005 | Yoshikawa et al. ...... | 359/208 |
| 2007/0002417 A1 | 1/2007 | Hirakawa et al. | |
| 2007/0030538 A1 | 2/2007 | Hirakawa et al. | |
| 2007/0211324 A1 | 9/2007 | Sakai et al. | |
| 2007/0211325 A1 | 9/2007 | Ichii | |
| 2007/0253047 A1 | 11/2007 | Ichii et al. | |

(Continued)

FOREIGN PATENT DOCUMENTS

JP    05-019202    1/1993

(Continued)

OTHER PUBLICATIONS

Raymond. A Serway, Physics for Scientists & Engineers, 4th Ed., vol. 2 (1996), p. 1065.*

(Continued)

*Primary Examiner* — Stephone Allen
*Assistant Examiner* — Kimberly N Kakalec
(74) *Attorney, Agent, or Firm* — Dickstein Shapiro LLP

(57) ABSTRACT

A first optical system couples a light beam from a light source, including a first lens made of glass with a positive power and a second lens made of plastic with a negative power. A second optical system focuses the light beam from the first optical system onto a scanning surface and moves a light spot on the scanning surface in a main-scanning direction. One of an incidence plane and an output plane of the first lens is spherical while the other is spherical or flat. A cross-sectional plane of the second lens along one of the main-scanning direction and a sub-scanning direction has a non-arc shape on at least one of the incidence plane and the output plane.

8 Claims, 18 Drawing Sheets

U.S. PATENT DOCUMENTS

| | | |
|---|---|---|
| 2007/0253048 A1 | 11/2007 | Sakai et al. |
| 2008/0024849 A1* | 1/2008 | Hayashi et al. ............... 359/204 |
| 2008/0025759 A1 | 1/2008 | Ichii et al. |
| 2008/0055672 A1 | 3/2008 | Watanabe et al. |
| 2008/0068693 A1 | 3/2008 | Hayashi et al. |
| 2008/0069690 A1 | 3/2008 | Ivakitch et al. |
| 2008/0100895 A1 | 5/2008 | Hayashi et al. |
| 2008/0123159 A1 | 5/2008 | Hayashi et al. |
| 2008/0180772 A1 | 7/2008 | Miyatake et al. |
| 2008/0192319 A1 | 8/2008 | Miyatake et al. |
| 2008/0204842 A1 | 8/2008 | Arai et al. |
| 2008/0212999 A1 | 9/2008 | Masuda et al. |
| 2008/0247021 A1 | 10/2008 | Ichii |
| 2008/0266633 A1 | 10/2008 | Hirakawa et al. |
| 2008/0267663 A1 | 10/2008 | Ichii et al. |

FOREIGN PATENT DOCUMENTS

| | | |
|---|---|---|
| JP | 05-341216 | 12/1993 |
| JP | 11271657 A * | 10/1999 |
| JP | 2000-019445 | 1/2000 |
| JP | 2001-075032 | 3/2001 |
| JP | 2002-214556 | 7/2002 |
| JP | 2002-277783 | 9/2002 |
| JP | 2006-330581 | 12/2006 |

OTHER PUBLICATIONS

Machine translation of JP 05-019202 (1993).*

* cited by examiner

| | | R [mm] | D [mm] | n | f [mm] | P [=1/f] |
|---|---|---|---|---|---|---|
| 15a | INCIDENCE PLANE | ∞ | D1=3 | 1.511146 | 43.82 | 0.022819 |
| | OUTPUT PLANE | -22.4 | D2=12 | 1 | | |
| 15b | INCIDENCE PLANE | ∞ | D3=2 | 1.523923 | -286.30 | -0.003493 |
| | OUTPUT PLANE | 150 | | | | |

FIG. 6

| | |
|---|---:|
| $R_{m0}$ | 150 |
| $R_{s0}$ | 150 |
| $a_{00}$ | — |
| $a_{01}$ | — |
| $a_{02}$ | — |
| $a_{03}$ | — |
| $a_{04}$ | $2.784259 \times 10^{-5}$ |
| $a_{05}$ | — |
| $a_{06}$ | $-4.437202 \times 10^{-6}$ |
| $a_{07}$ | — |
| $a_{08}$ | $2.682096 \times 10^{-7}$ |
| $b_{01}$ | — |
| $b_{02}$ | — |
| $b_{03}$ | — |
| $b_{04}$ | — |
| $b_{05}$ | — |
| $b_{06}$ | — |
| $b_{07}$ | — |
| $b_{08}$ | — |

FIG. 11

| | DEFLECTOR-SIDE SCANNING LENS | |
|---|---|---|
| | INCIDENCE PLANE | OUTPUT PLANE |
| $R_{m0}$ | −120 | −59.279 |
| $R_{s0}$ | −400 | −505 |
| $a_{00}$ | 0 | 0 |
| $a_{04}$ | $8.8852 \times 10^{-7}$ | $9.2241 \times 10^{-7}$ |
| $a_{06}$ | $-2.6291 \times 10^{-10}$ | $6.7783 \times 10^{-11}$ |
| $a_{08}$ | $2.1846 \times 10^{-14}$ | $-4.1124 \times 10^{-14}$ |
| $a_{10}$ | $1.3677 \times 10^{-17}$ | $1.3728 \times 10^{-17}$ |
| $a_{12}$ | $-3.1354 \times 10^{-21}$ | $2.0696 \times 10^{-21}$ |
| $b_{01}$ | — | $8.9385 \times 10^{-6}$ |
| $b_{02}$ | — | $-4.5506 \times 10^{-6}$ |
| $b_{03}$ | — | $-5.8661 \times 10^{-9}$ |
| $b_{04}$ | — | $3.1924 \times 10^{-9}$ |
| $b_{05}$ | — | $-1.8861 \times 10^{-11}$ |
| $b_{06}$ | — | $-1.5755 \times 10^{-11}$ |
| $b_{07}$ | — | $3.3195 \times 10^{-14}$ |
| $b_{08}$ | — | $1.6469 \times 10^{-14}$ |
| $b_{09}$ | — | $-1.2944 \times 10^{-17}$ |
| $b_{10}$ | — | $-4.9300 \times 10^{-18}$ |

FIG. 12

| | IMAGE-SIDE SCANNING LENS | |
| --- | --- | --- |
| | INCIDENCE PLANE | OUTPUT PLANE |
| $R_{m0}$ | −10000 | 540.625 |
| $R_{s0}$ | 320 | −42.945 |
| $a_{00}$ | 0 | 0 |
| $a_{04}$ | $3.2856 \times 10^{-7}$ | $1.2780 \times 10^{-7}$ |
| $a_{06}$ | $-7.0854 \times 10^{-11}$ | $-4.6287 \times 10^{-11}$ |
| $a_{08}$ | $6.2692 \times 10^{-15}$ | $4.0492 \times 10^{-15}$ |
| $a_{10}$ | $-2.7316 \times 10^{-19}$ | $-1.6597 \times 10^{-19}$ |
| $a_{12}$ | $4.7388 \times 10^{-24}$ | $2.5855 \times 10^{-24}$ |
| $b_{01}$ | $4.4850 \times 10^{-7}$ | — |
| $b_{02}$ | $-1.0474 \times 10^{-6}$ | $2.4202 \times 10^{-7}$ |
| $b_{03}$ | $-4.4386 \times 10^{-11}$ | — |
| $b_{04}$ | $5.7368 \times 10^{-11}$ | — |
| $b_{05}$ | $7.9222 \times 10^{-15}$ | — |
| $b_{06}$ | $1.6023 \times 10^{-14}$ | — |
| $b_{07}$ | $1.1529 \times 10^{-18}$ | — |
| $b_{08}$ | $-2.0146 \times 10^{-18}$ | — |
| $b_{09}$ | $-1.4713 \times 10^{-22}$ | — |
| $b_{10}$ | $6.9213 \times 10^{-23}$ | — |

FIG. 23

| | DEFLECTOR-SIDE SCANNING LENS | |
|---|---|---|
| | INCIDENCE PLANE | OUTPUT PLANE |
| $R_n y$ | −119.428 | −59.279 |
| $K_n$ | — | — |
| $A_n$ | $9.24816 \times 10^{-7}$ | $9.48532 \times 10^{-7}$ |
| $B_n$ | $-2.62389 \times 10^{-10}$ | $7.41815 \times 10^{-11}$ |
| $C_n$ | $2.13479 \times 10^{-14}$ | $-3.82368 \times 10^{-14}$ |
| $D_n$ | $1.59389 \times 10^{-17}$ | $1.07002 \times 10^{-17}$ |
| $E_n$ | $-2.62569 \times 10^{-21}$ | $4.37611 \times 10^{-21}$ |
| $R_n z$ | ∞ | ∞ |
| $a_n$ | $7.03138 \times 10^{-6}$ | — |
| $b_n$ | $2.95315 \times 10^{-10}$ | — |
| $c_n$ | $-2.25975 \times 10^{-12}$ | — |
| $d_n$ | — | — |
| $e_n$ | — | — |
| $F_2$ | — | $-5.73974 \times 10^{-6}$ |
| $F_4$ | — | $-1.77749 \times 10^{-10}$ |
| $F_6$ | — | $-1.55089 \times 10^{-13}$ |
| $F_8$ | — | $-2.67364 \times 10^{-16}$ |
| $F_{10}$ | — | $4.16646 \times 10^{-20}$ |

FIG. 24

|  | IMAGE-SIDE SCANNING LENS | |
|---|---|---|
|  | INCIDENCE PLANE | OUTPUT PLANE |
| $R_n y$ | −10000 | −540.6253 |
| $K_n$ | — | — |
| $A_n$ | $3.285627 \times 10^{-7}$ | $1.277984 \times 10^{-7}$ |
| $B_n$ | $-7.085422 \times 10^{-11}$ | $-4.628731 \times 10^{-11}$ |
| $C_n$ | $6.269224 \times 10^{-15}$ | $4.049210 \times 10^{-15}$ |
| $D_n$ | $-2.731570 \times 10^{-19}$ | $-1.659747 \times 10^{-19}$ |
| $E_n$ | $4.738805 \times 10^{-24}$ | $2.585484 \times 10^{-24}$ |
| $R_n z$ | ∞ | −37.94245 |
| $a_n$ | — | $1.317747 \times 10^{-6}$ |
| $b_n$ | — | $-1.030720 \times 10^{-10}$ |
| $c_n$ | — | $-8.744780 \times 10^{-15}$ |
| $d_n$ | — | $2.593978 \times 10^{-18}$ |
| $e_n$ | — | $-2.436017 \times 10^{-22}$ |
| $f_n$ | — | $8.689978 \times 10^{-27}$ |
| $F_2$ | $3.477136 \times 10^{-7}$ | — |
| $F_4$ | $-6.560344 \times 10^{-11}$ | — |
| $F_6$ | $7.601918 \times 10^{-15}$ | — |
| $F_8$ | $-5.383658 \times 10^{-19}$ | — |
| $F_{10}$ | $1.947994 \times 10^{-23}$ | — |

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-024681 filed in Japan on Feb. 5, 2008.

BACKGROUND OF THE INVENTION

1. Field of the Invention

The present invention relates to a technology for scanning a target surface with a light beam.

2. Description of the Related Art

In recent years, there has been a growing demand for low-cost image forming apparatuses such as laser printers and digital copiers. One approach for achieving such low-cost image forming apparatuses is to employ scanning lenses made of plastic in an optical scanning device. However, because plastic exhibits a greater change in optical characteristics due to moisture absorption or temperature change than glass, there is a risk of changing the diameter of a light spot on the surface to be scanned from a change in the operating environment.

To overcome this problem, optical scanning devices that reduce the amount of change in spot size resulting from fluctuation in environmental factors, such as temperature and humidity, while still employing a plastic optical element have been proposed (see, for example, Japanese Patent No. 3483141, Japanese Patent No. 3483129, and Japanese Patent Application Laid-open No. 2002-277783).

Unfortunately, the optical scanning devices disclosed in the above literatures require a plurality of lenses to be positioned with high accuracy or need to employ many components in addition to lenses. Therefore, it is expected that enhancing the scanning accuracy at low cost will be difficult using these optical scanning devices.

SUMMARY OF THE INVENTION

It is an object of the present invention to at least partially solve the problems in the conventional technology.

According to one aspect of the present invention, there is provided an optical scanning device that scans a scanning surface with a light beam in a main-scanning direction. The optical scanning device includes a light source that emits the light beam; a first optical system that couples the light beam from the light source, which includes a first lens made of glass having a positive power and a second lens made of plastic having a negative power; and a second optical system that focuses the light beam from the first optical system onto the scanning surface and moves a light spot obtained by focusing the light beam on the scanning surface in the main-scanning direction. One of an incidence plane and an output plane of the first lens is spherical while other of the incidence plane and the output plane is spherical or flat. A cross-sectional plane of the second lens along one of a first direction corresponding to the main-scanning direction and a second direction corresponding to a sub-scanning direction perpendicular to the main-scanning direction has a non-arc shape on at least one of the incidence plane and the output plane, the first surface and the second direction.

Furthermore, according to another aspect of the present invention, there is provided an image forming apparatus including at least one image carrier; and at least one optical scanning device that scans the at least one image carrier with a light beam modulated according to image information. The optical scanning device includes a light source that emits the light beam, a first optical system that couples the light beam from the light source, which includes a first lens made of glass having a positive power and a second lens made of plastic having a negative power, and a second optical system that focuses the light beam from the first optical system onto the scanning surface and moves a light spot obtained by focusing the light beam on the scanning surface in the main-scanning direction. One of an incidence plane and an output plane of the first lens is spherical while other of the incidence plane and the output plane is spherical or flat. A cross-sectional plane of the second lens along one of a first direction corresponding to the main-scanning direction and a second direction corresponding to a sub-scanning direction perpendicular to the main-scanning direction has a non-arc shape on at least one of the incidence plane and the output plane, the first surface and the second direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table (No. 3) for explaining a coupling optical system in FIG. 2;

FIG. 11 is a table (No. 1) for explaining the shape of a deflector-side scanning lens in FIG. 2;

FIG. 12 is a table (No. 1) for explaining the shape of an image-side scanning lens in FIG. 2;

FIG. 23 is a table for explaining one example of the shape of a deflector-side scanning lens in FIG. 22;

FIG. 24 is a table for explaining one example of the shape of an image-side scanning lens in FIG. 22.

DETAILED DESCRIPTION OF THE PREFERRED EMBODIMENTS

Exemplary embodiments of the present invention are explained in detail below with reference to the accompanying drawings.

Figure 1:
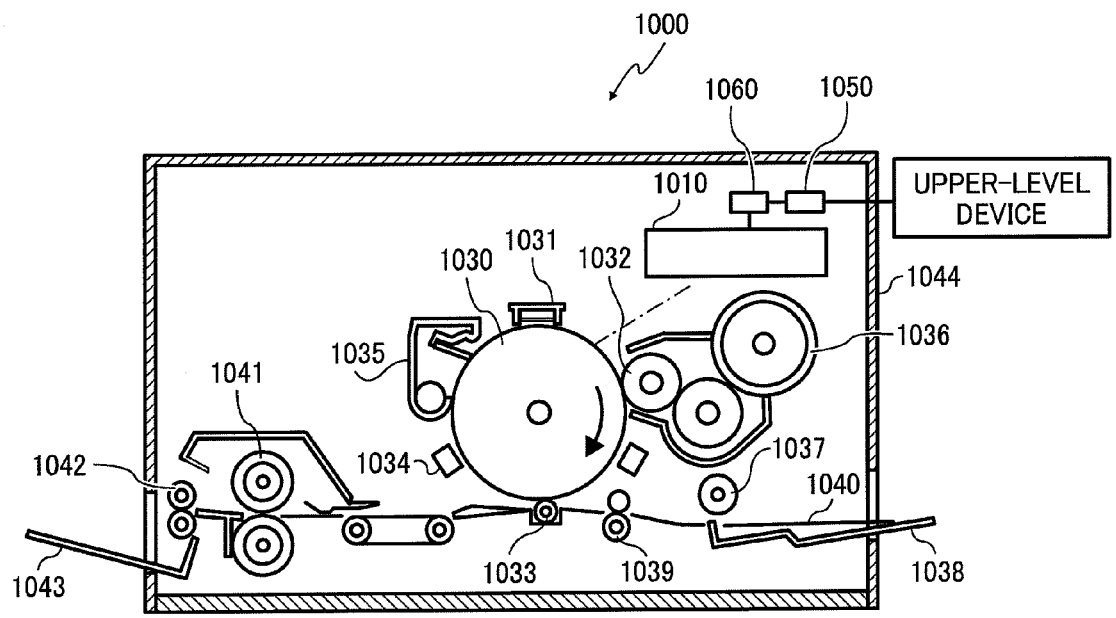
FIG. 1 is a schematic diagram of an exemplary structure of a laser printer according to one embodiment of the present invention.

FIG. 1 is a schematic diagram of a laser printer 1000 as an image forming apparatus according to the present invention.

The laser printer 1000 includes an optical scanning device 1010 according to a first embodiment of the present invention, a photosensitive drum 1030, a charging unit 1031, a developing roller 1032, a transfer charging unit 1033, a neutralizing unit 1034, a cleaning unit 1035, a toner cartridge 1036, a feed roller 1037, a feed tray 1038, a pair of registration rollers 1039, a fixing roller 1041, a discharge roller 1042, a discharge tray 1043, a communication control unit 1050, a printer control unit 1060 that controls each of the components, and so forth. These components are arranged at predetermined positions in a printer casing 1044.

The communication control unit 1050 controls a bi-directional communication with an upper-level device (e.g., a personal computer (PC)) via a network.

The photosensitive drum 1030 is a cylindrical member having a photosensitive layer formed on the surface thereof. The surface of the photosensitive drum 1030 is a scanning surface to be scanned. The photosensitive drum 1030 rotates in the direction indicated by the arrow shown in FIG. 1.

The charging unit 1031, the developing roller 1032, the transfer charging unit 1033, the neutralizing unit 1034, and the cleaning unit 1035 are arranged near the surface of the photosensitive drum 1030. More specifically, they are arranged in following order along the rotational direction of the photosensitive drum 1030: the charging unit 1031→the developing roller 1032→the transfer charging unit 1033→the neutralizing unit 1034→the cleaning unit 1035.

The charging unit 1031 uniformly charges the surface of the photosensitive drum 1030.

The optical scanning device 1010 irradiates the surface of the photosensitive drum 1030 charged by the charging unit 1031 with a light beam modulated based on image information from the upper-level device. By doing so, a latent image corresponding to the image information is formed on the surface of the photosensitive drum 1030. The formed latent image moves towards the developing roller 1032 along with the rotation of the photosensitive drum 1030.

Toner stored in the toner cartridge 1036 is supplied to the developing roller 1032.

The developing roller 1032 applies the toner supplied from the toner cartridge 1036 onto the latent image formed on the surface of the photosensitive drum 1030 to make the image information a visual image. The latent image having the toner applied thereon (hereinafter, also referred to as "a toner image" for the sake of convenience) moves towards the transfer charging unit 1033 along with the rotation of the photosensitive drum 1030.

Recording sheets 1040 are stored in the feed tray 1038. Near the feed tray 1038 is the feed roller 1037, which takes the recording sheets 1040 out of the feed tray 1038 one at a time and transports the recording sheet 1040 to the registration rollers 1039. The registration rollers 1039 temporarily hold the recording sheet 1040 taken out by the feed roller 1037 and feeds the recording sheet 1040 to between the photosensitive drum 1030 and the transfer charging unit 1033 along with the rotation of the photosensitive drum 1030.

A voltage of opposite polarity to that of the toner is applied to the transfer charging unit 1033 to electrically transfer the toner on the surface of the photosensitive drum 1030 onto the recording sheet 1040. With this voltage, the toner image on the surface of the photosensitive drum 1030 is transferred to the recording sheet 1040. The recording sheet 1040 with the transferred toner is sent to the fixing roller 1041.

The fixing roller 1041 applies heat and pressure to the recording sheet 1040, thereby causing the toner to be fixed on the recording sheet 1040. The recording sheets 1040 on which toner has been fixed in this manner are sent to the discharge tray 1043 via the discharge roller 1042 and are stacked on the discharge tray 1043 sequentially.

The neutralizing unit 1034 neutralizes the surface of the photosensitive drum 1030.

The cleaning unit 1035 removes any toner (residual toner) remaining on the surface of the photosensitive drum 1030 after transferring the toner image. The surface of the photosensitive drum 1030 from which the residual toner has been removed returns to a position facing the charging unit 1031.

Figure 2:
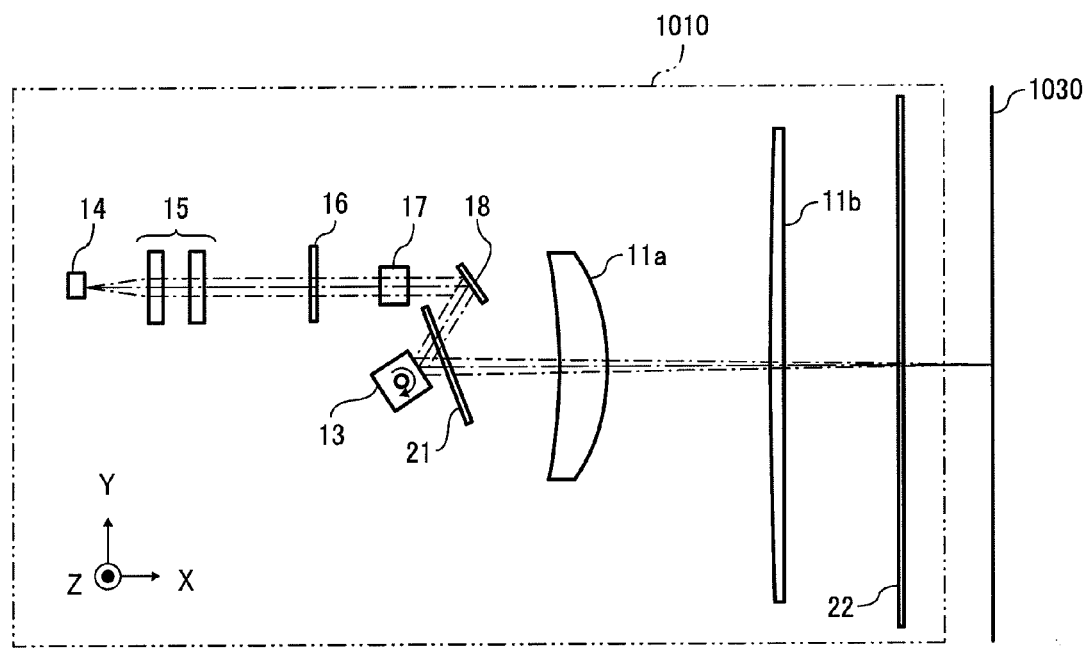
FIG. 2 is a schematic diagram of an exemplary structure of an optical scanning device in FIG. 1.

Referring to FIG. 2, the optical scanning device 1010 includes a light source 14, a coupling optical system 15, an aperture plate 16, a cylindrical lens 17, a reflecting mirror 18, a polygon mirror 13, a polygon motor (not shown in the figure) that rotates the polygon mirror 13, a deflector-side scanning lens 11a, an image-side scanning lens 11b, a scan control apparatus (not shown in the figure), a substantially rectangular-block-shaped housing (not shown in the figure) that accommodates the components described above, and so forth. The present specification assumes that the direction along the longitudinal direction of the photosensitive drum 1030 is the Y-axis direction and the direction along the optical axis of the scanning lenses (11a and 11b) is the X-axis direction in the XYZ three-dimensional Cartesian coordinate system.

Hereinafter, the direction corresponding to the main-scanning direction is referred to as "a direction corresponding to the main scanning" and the direction corresponding to the sub-scanning direction is referred to as "a direction corresponding to the sub-scanning" for the sake of convenience.

Figure 3:
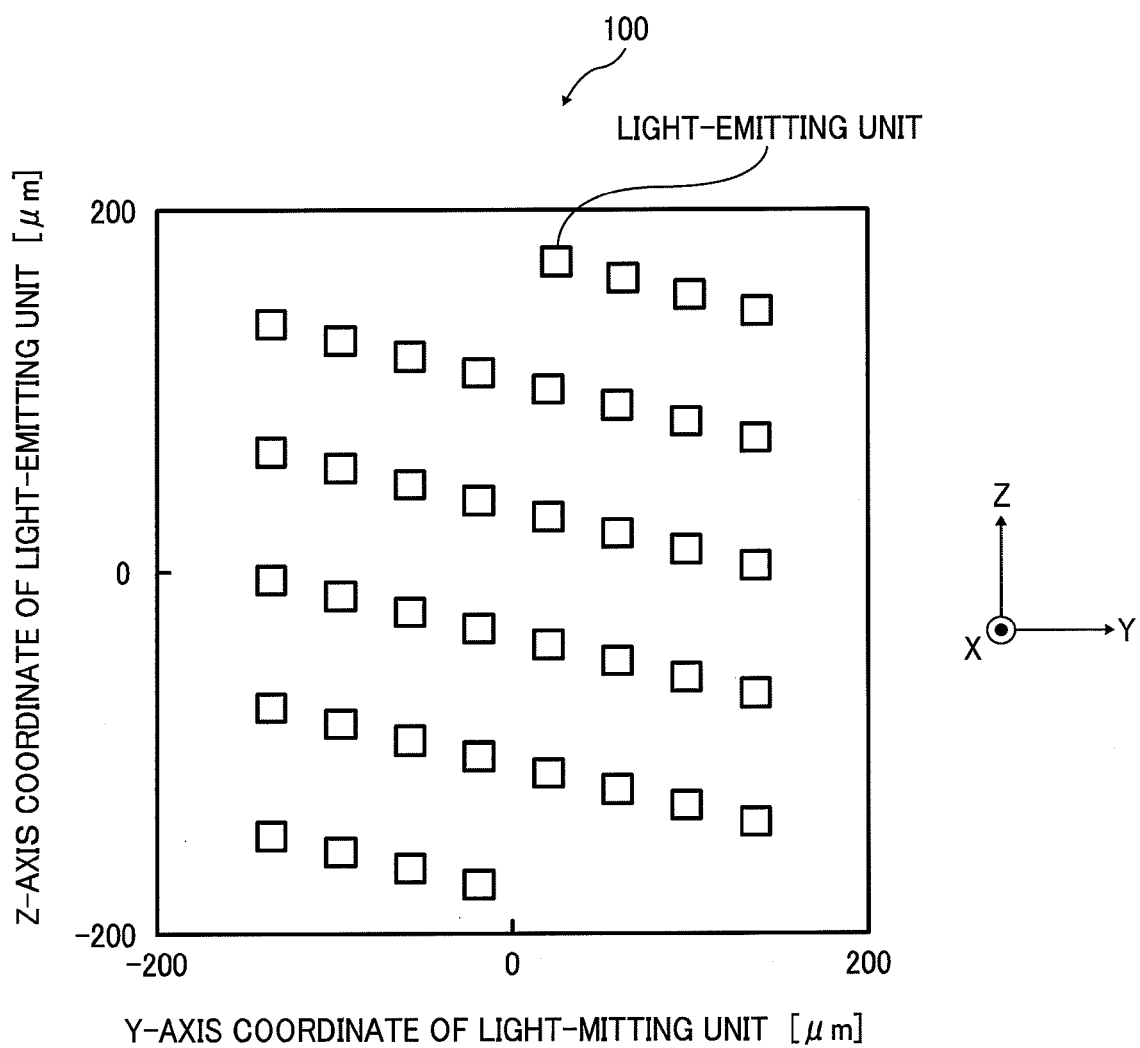
FIG. 3 is a diagram for explaining a light source in FIG. 2.

The light source 14 includes 40 light-emitting units that are two-dimensionally arranged on a single substrate, for example, as shown in FIG. 3. Each of the light-emitting units is a vertical-cavity surface-emitting laser (VCSEL) with an oscillation wavelength of 780 nm. In other words, the light source 14 includes a surface-emitting laser array 100. The embodiment assumes that each of the light-emitting units radiates a light beam in the X-axis direction. In general, surface-emitting lasers exhibit only a small change in oscillation wavelength due to temperature change and, in principle, do not suffer from discontinuity of wavelength (so-called intermittent wavelength).

When expressed as full width half maximum (FWHM), the divergence angle of a light beam emitted from each light-emitting unit is 6.8±1° both in the direction corresponding to main scanning and in the direction corresponding to sub-scanning. The near-field pattern of each light-emitting unit is a circle with a diameter of 4 μm. The surface-emitting laser array 100 is packaged, and a cover glass with a thickness of 0.3 mm is provided on the front side of the surface-emitting laser array 100.

Referring back to FIG. 2, the coupling optical system 15 converts the light beam from the light source 14 into a substantially collimated light beam.

Figures 4, 5:
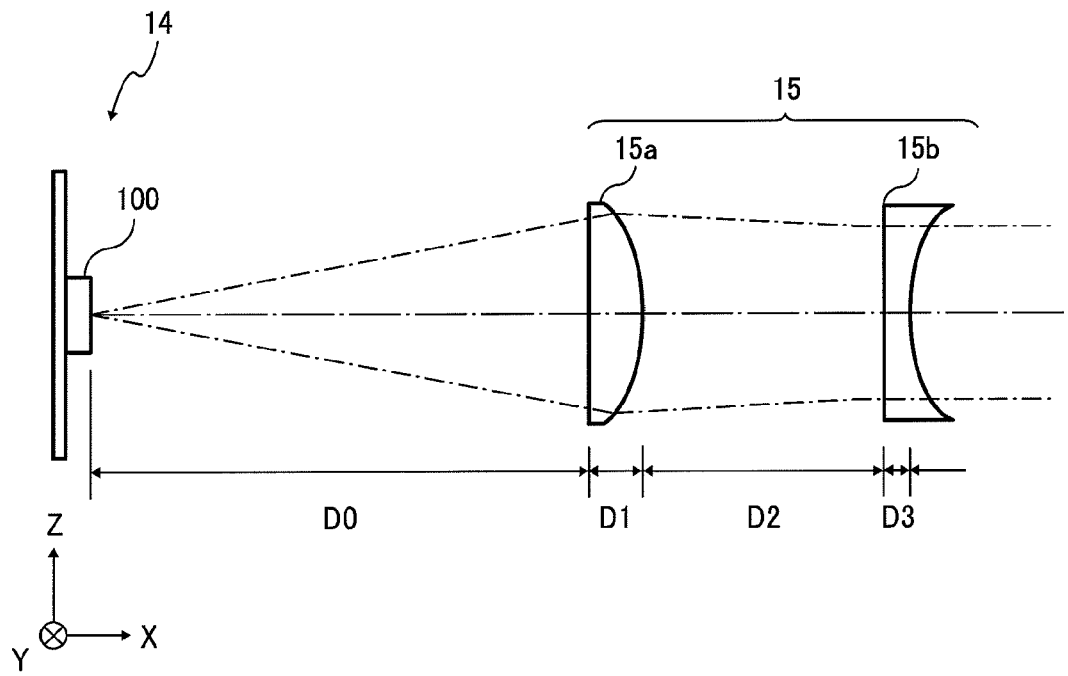
FIG. 4 is a diagram (No. 1) for explaining a coupling optical system in FIG. 2.
FIG. 5 is a table (No. 2) for explaining a coupling optical system in FIG. 2.

For example, as shown in FIG. 4, the coupling optical system 15 includes a first lens 15a and a second lens 15b in the embodiment.

The first lens 15a is made of glass and has positive power. In the embodiment, the −X-side surface (incidence plane) is a flat surface, and the +X-side surface (output plane) is a spherical surface. Referring to FIG. 5, in the embodiment, the radius of curvature of the incidence plane is ∞ (infinite), and the radius of curvature of the output plane is −22.4 mm. Furthermore, the refractive index n is 1.511146, the thickness at the center (reference symbol D1 in FIG. 4) is 3 mm, and the focal length f is 43.82 mm.

The second lens 15b is made of plastic and has negative power. In the embodiment, the −X-side surface (incidence plane) is a flat surface, and the +X-side surface (output plane) is an aspherical surface. Referring to FIG. 5, the radius of curvature of the incidence plane is ∞ (infinite), and the radius of curvature of the output plane is 150 mm in the embodiment. Furthermore, the refractive index n is 1.523923, the thickness at the center (reference symbol D3 in FIG. 4) is 2 mm, and the focal length f is −286.30 mm.

The output plane of the second lens 15b is an aspherical surface represented by Expressions (1) and (2) below. In Expressions (1) and (2) below, X is a coordinate in the X-axis direction, and Y is a coordinate in the Y-axis direction. It is assumed that the center of the incidence plane is Y=0. $C_{m0}$ indicates the curvature in the direction corresponding to main scanning at Y=0, which is the reciprocal of the radius of curvature $R_{m0}$. $a_{00}, a_{01}, a_{02}, \ldots$ are aspherical coefficients in the direction corresponding to main scanning. Cs(Y) is the curvature at the coordinate Y in the direction corresponding to sub-scanning, $R_{s0}$ is the radius of curvature on the optical axis in the direction corresponding to sub-scanning, and $b_{00}, b_{01}, b_{02}, \ldots$ are aspherical coefficients in the direction corresponding to sub-scanning. The optical axis refers to the axis that passes through the center point in the direction corresponding to sub-scanning at Y=0.

$$X(Y) = \frac{C_{m0} \cdot Y^2}{1 + \sqrt{1 - (1 + a_{00}) \cdot C_{m0}^2 \cdot Y^2}} + \quad (1)$$
$$a_{01} \cdot Y + a_{02} \cdot Y^2 + a_{03} \cdot Y^3 + a_{04} \cdot Y^4 + \ldots$$

$$Cs(Y) = \frac{1}{R_{s0}} + b_{01} \cdot Y + b_{02} \cdot Y^2 + b_{03} \cdot Y^3 + \ldots \quad (2)$$

FIG. 6 is a table showing one example of values of $R_{m0}$ (units: mm), $R_{s0}$ (units: mm), and the aspherical coefficients on the output plane of the second lens 15b. In short, at the output plane of the second lens 15b, the cross-sectional plane of the second lens 15b along the direction corresponding to main scanning has a non-arc shape, and the cross-sectional plane of the second lens 15b along the direction corresponding to sub-scanning has an arc shape.

Referring to FIG. 5, the power P of the first lens 15a is 0.022819, and the power P of the second lens 15b is −0.003493. In other words, the power of the first lens 15a is larger than the absolute value of the power of the second lens 15b.

Figure 7A:
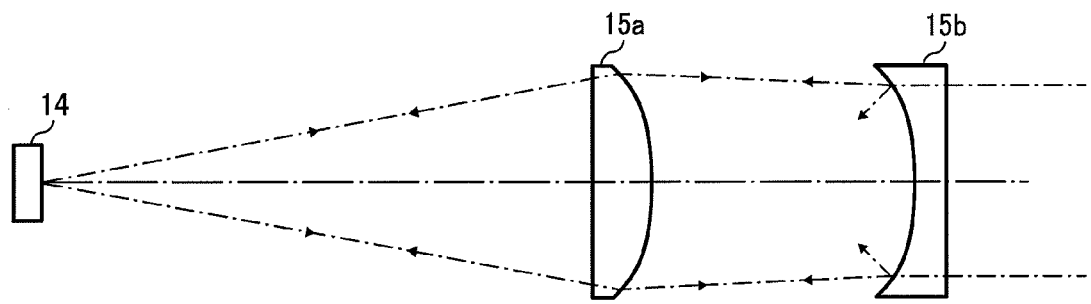
FIGS. 7A and 7B are diagrams for explaining the light path of stray light from a second lens.

If the incidence plane of the second lens 15b is an aspherical surface, as shown in FIG. 7A, the light beam reflected at the output plane of the second lens 15b returns to the light source 14 as stray light, possibly causing the oscillation state of the surface-emitting laser array 100 to deteriorate. It is also possible that the stray light will be reflected at the light source 14 and be incident upon each of the scanning lenses, causing the density of the image to fluctuate.

Figure 7B:
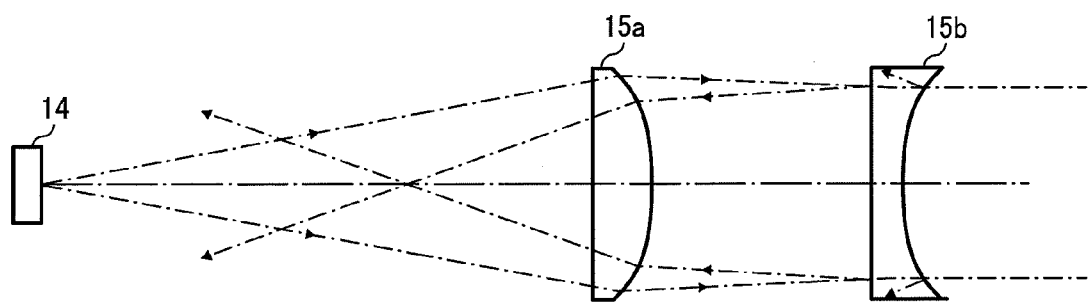

In the embodiment, because the output plane of the second lens 15b is an aspherical surface, the amount of stray light returning to the light source 14 can be reduced significantly, as shown in FIG. 7B. As a result, there is no need to provide the second lens 15b with an anti-reflection coating, which further reduces the cost.

Figure 8:
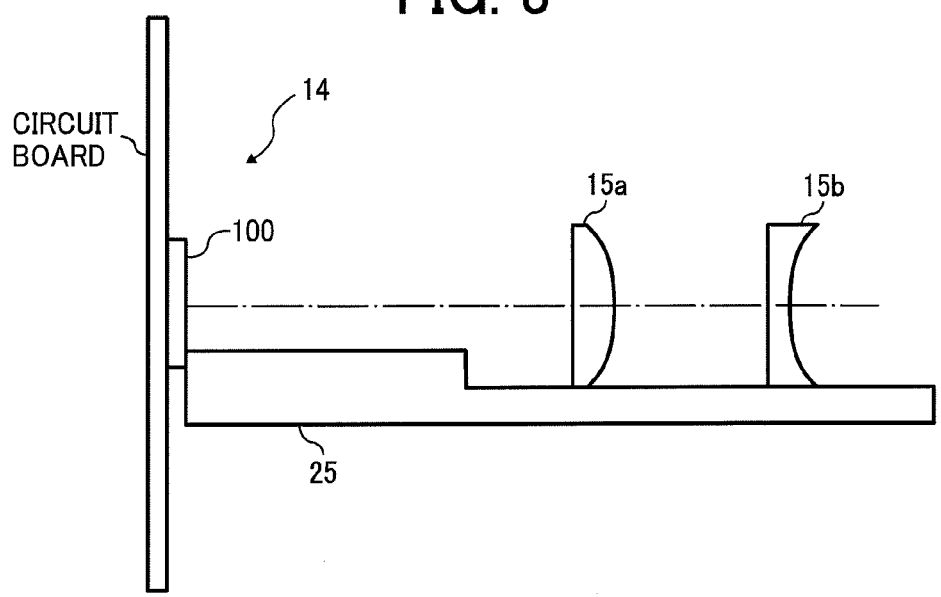
FIG. 8 is a diagram of a holding member.

For example, as shown in FIG. 8, the light source 14 and the coupling optical system 15 are held together with a holding member 25 in a predetermined positional relationship and are grouped together as a light-source unit LU.

Figure 9:
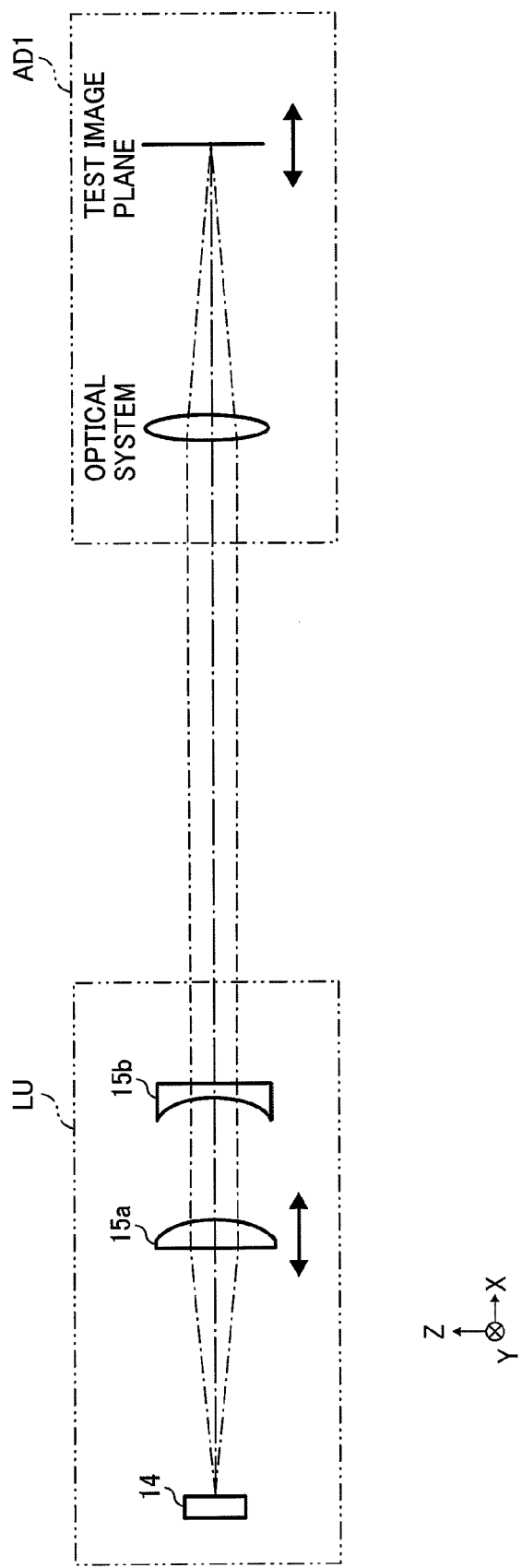
FIG. 9 is a diagram (No. 1) for explaining an adjustment procedure for a coupling optical system.

Adjustment of the Coupling Optical System (1) The light-source unit LU is set at a predetermined position relative to a light-source-unit testing apparatus AD1 (refer to FIG. 9).

(2) The first lens 15a is moved in the X-axis direction so that the light beam emitted from each of the light-emitting units of the light source 14 is focused on the test image plane of the light-source-unit testing apparatus AD1 (refer to FIG. 9). The focal length of the optical system of the light-source-unit testing apparatus AD1 is 240 mm. By doing so, the light beam output from the light-source unit LU is placed in an appropriate state, and the light-source unit LU as adopted in the optical scanning device can enhance the imaging accuracy on the surface to be scanned. In other words, errors of the focal position of the entire optical system are restricted below the desired level.

Figure 10:
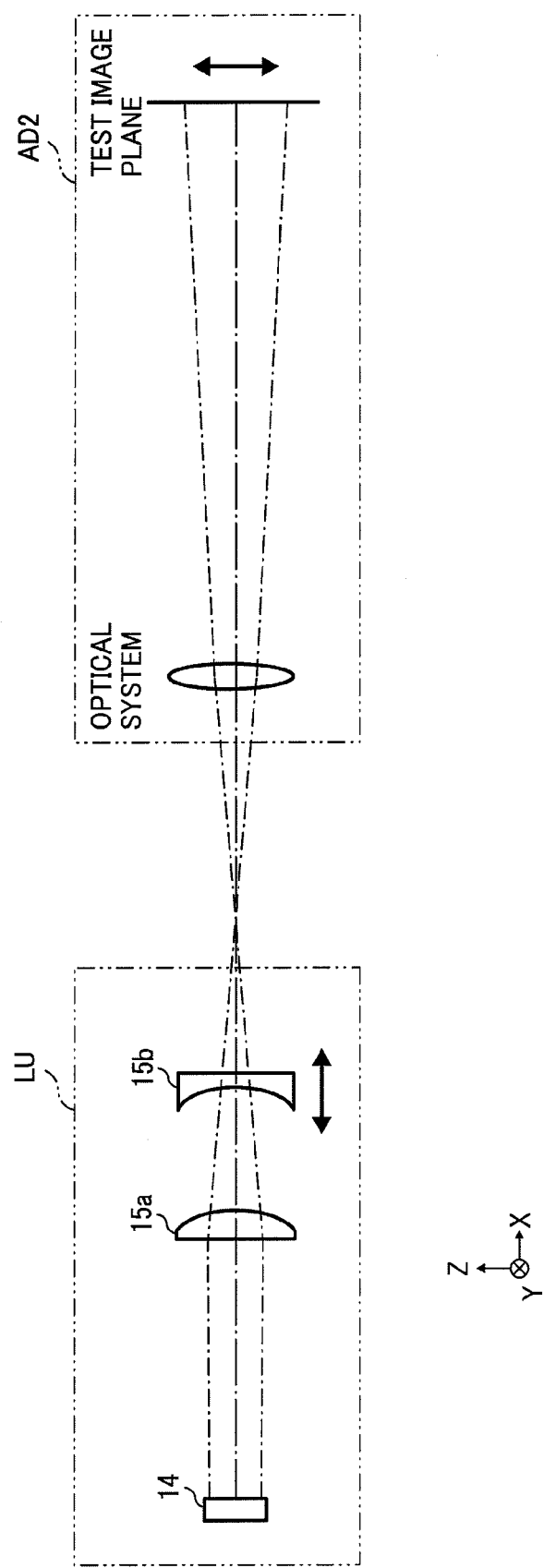
FIG. 10 is a diagram (No. 2) for explaining an adjustment procedure for a coupling optical system.

(3) The light-source unit LU is set at a predetermined position relative to a light-source-unit testing apparatus AD2 (refer to FIG. 10).

(4) The second lens 15b is moved in the X-axis direction so that the light beam emitted from each of the light-emitting units of the light source 14 forms a beam pitch with a desired value on the test image plane of the light-source-unit testing apparatus AD2 (refer to FIG. 10). The focal length of the optical system of the light-source-unit testing apparatus AD2 is 147.15 mm. For this reason, whereas the desired lateral magnification in the sub-scanning direction of the entire optical system of the optical scanning device 1010 is ×1.19, the lateral magnification of the entire optical system of the light-source-unit testing apparatus AD2 is ×3. This allows errors to be measured in a magnified state, thus enabling adjustment with higher accuracy. For example, the second lens 15b is moved in the X-axis direction so that the light beams emitted from two light-emitting units 393 μm apart from each other in the Z-axis direction form a beam pitch of 1179 μm on the test image plane of the light-source-unit testing apparatus AD2. As a result, even if the radiuses of curvature of the first lens 15a and the second lens 15b have a certain level of errors (e.g., manufacturing errors), not only can the combined focal length of the coupling optical system 15 be set to a desired value (49.05 mm in the embodiment), but also errors of the spacing between scanning lines on the surface to be scanned can be reduced when the coupling optical system 15 is used in the optical scanning device. In short, errors of the lateral magnification in the direction corresponding to sub-scanning of the entire optical system can be reduced below a desired level.

When the position of the second lens 15b is to be adjusted, there is risk of changing the focal position of the entire optical system. However, because the power of the first lens 15a is larger than the absolute value of the power of the second lens 15b, a change in the focal position is very small.

(5) The first lens 15a and the second lens 15b are fixed to the holding member 25 with an adhesive.

For example, UV curable resin may be applied in advance to the adhesive surfaces of the first lens 15a and the second lens 15b, the UV curable resin may be irradiated with ultraviolet radiation after the position has been decided, and then the first lens 15a and the second lens 15b may be fixed on the holding member 25. In this case, even if the processes are simplified, high positional accuracy can be achieved.

In the embodiment, the distance (reference symbol D0 in FIG. 4) between the surface-emitting laser array 100 and the first lens 15a is 49.45 mm. Furthermore, the optical path length (reference symbol D2 in FIG. 4) between the output plane of the first lens 15a and the incidence plane of the second lens 15b is 12 mm.

The light-source unit LU adjusted in this manner is set at a predetermined position in the housing (not shown in the figure) of the optical scanning device 1010. In short, the positional relationship among the light source 14, the first lens 15a, and the second lens 15b is defined with high accuracy before other optical components are assembled.

Referring back to FIG. 2, the aperture plate 16 has, for example, a rectangular or elliptical aperture portion with a front width of 5.8 mm in the direction corresponding to main scanning (Y-axis direction in the embodiment) and with a front width of 1.28 mm in the direction corresponding to sub-scanning (Z-axis direction in the embodiment) to specify the beam diameter of the light beam that has passed through the coupling optical system.

The cylindrical lens 17 focuses, in the direction corresponding to sub-scanning (the Z-axis direction in the embodiment), the light beam that has passed through the aperture portion of each aperture plate 16 onto a point near the deflecting reflection surface of the polygon mirror 13 via the reflecting mirror 18. The focal length of the cylindrical lens 17 is 60.8 mm.

Soundproof glass 21 is disposed between the reflecting mirror 18 and the polygon mirror 13 and between the polygon mirror 13 and the deflector-side scanning lens 11a.

The optical system on the optical path between the light source 14 and the polygon mirror 13 is also called a pre-deflector optical system. In the embodiment, the pre-deflector optical system includes the coupling optical system 15, the aperture plate 16, the cylindrical lens 17, and the reflecting mirror 18.

The polygon mirror 13 includes, for example, tetrahedral mirrors whose inscribed circle has a radius of 8 millimeters, and the mirrors function as deflecting reflection surfaces. The polygon mirror 13 rotates at a constant speed about an axis parallel to the direction corresponding to sub-scanning (Z-axis direction in the embodiment) to deflect the light beam from the cylindrical lens 17. The effective region of each of the deflecting reflection surfaces has a size of 7.8×2.0 mm.

The deflector-side scanning lens 11a is arranged on the optical path of the light beam deflected by the polygon mirror 13.

The image-side scanning lens 11b is arranged on the optical path of the light beam that has passed through the deflector-side scanning lens 11a. The surface of the photosensitive drum 1030 is irradiated with the light beam that has passed through the image-side scanning lens 11b to form a light spot. The light spot moves in the longitudinal direction of the photosensitive drum 1030 along with the rotation of the polygon mirror 13 so that the photosensitive drum 1030 is scanned. The moving direction of the light spot corresponds to the "main-scanning direction". On the other hand, the rotational direction of the photosensitive drum 1030 corresponds to the "sub-scanning direction".

Each surface (the −X-side surface (incidence plane) and the +X-side surface (output plane)) of the deflector-side scanning lens 11a and the image-side scanning lens 11b is an aspherical surface represented by Expressions (1) and (2) above.

FIGS. 11 and 12 are tables showing one example of values of $R_{m0}$ (units: mm), $R_{s0}$ (units: mm), and the aspherical coefficients on each surface (incidence plane and output plane) of each of the scanning lenses.

Figure 13:
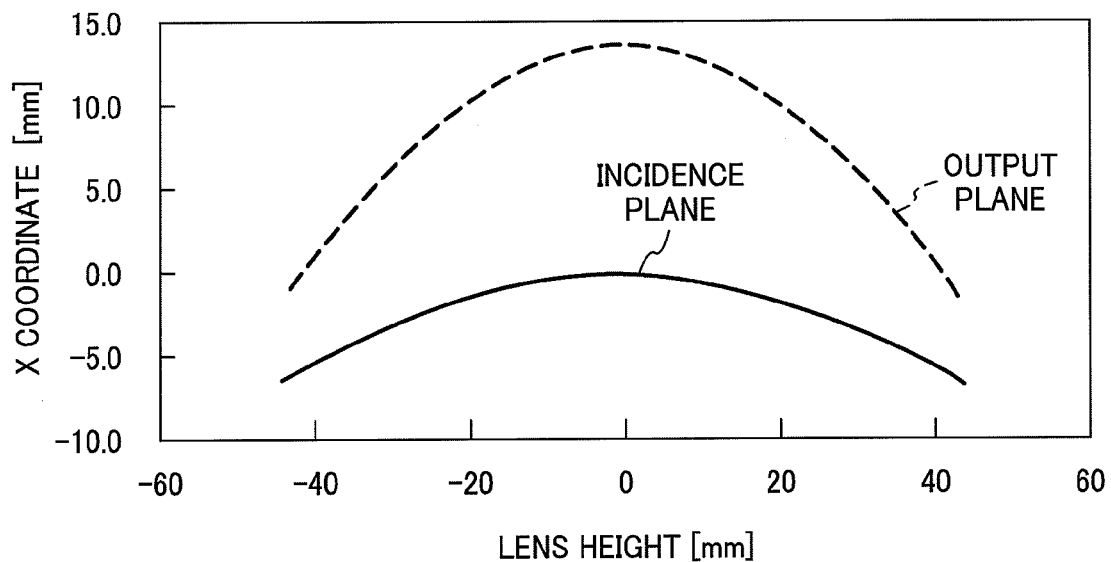
FIG. 13 is a diagram (No. 2) for explaining the shape of a deflector-side scanning lens in FIG. 2.
Figure 14:
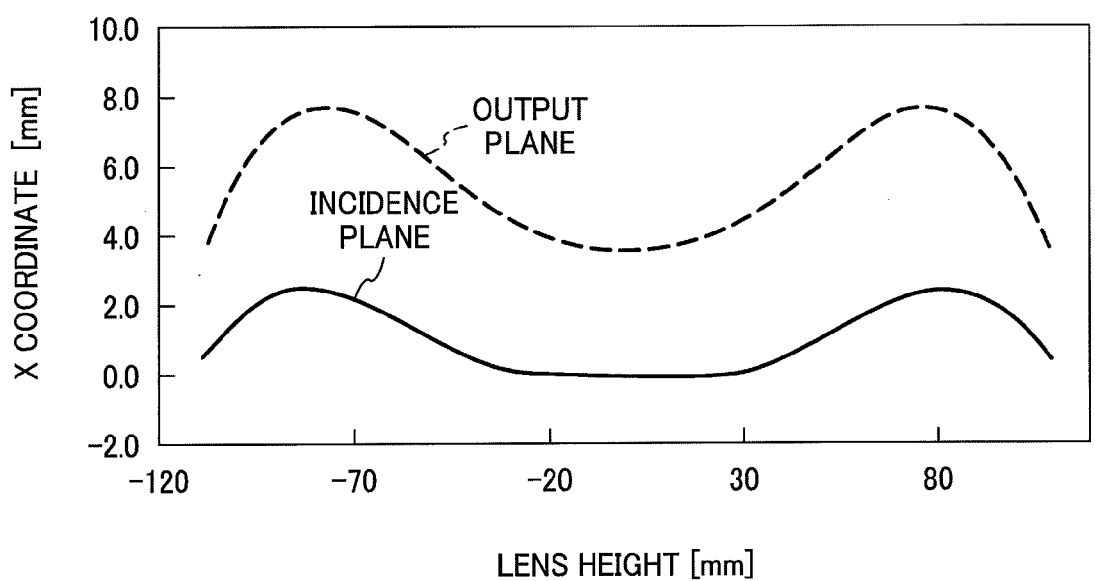
FIG. 14 is a diagram (No. 2) for explaining the shape of an image-side scanning lens in FIG. 2.

FIG. 13 is a diagram of the shape of the deflector-side scanning lens 11a that is obtained by substituting the values of FIG. 11 into Expression (1) above. FIG. 14 is a diagram of the shape of the image-side scanning lens 11b that is obtained by substituting the values of FIG. 12 into Expression (1) above.

Figure 15:
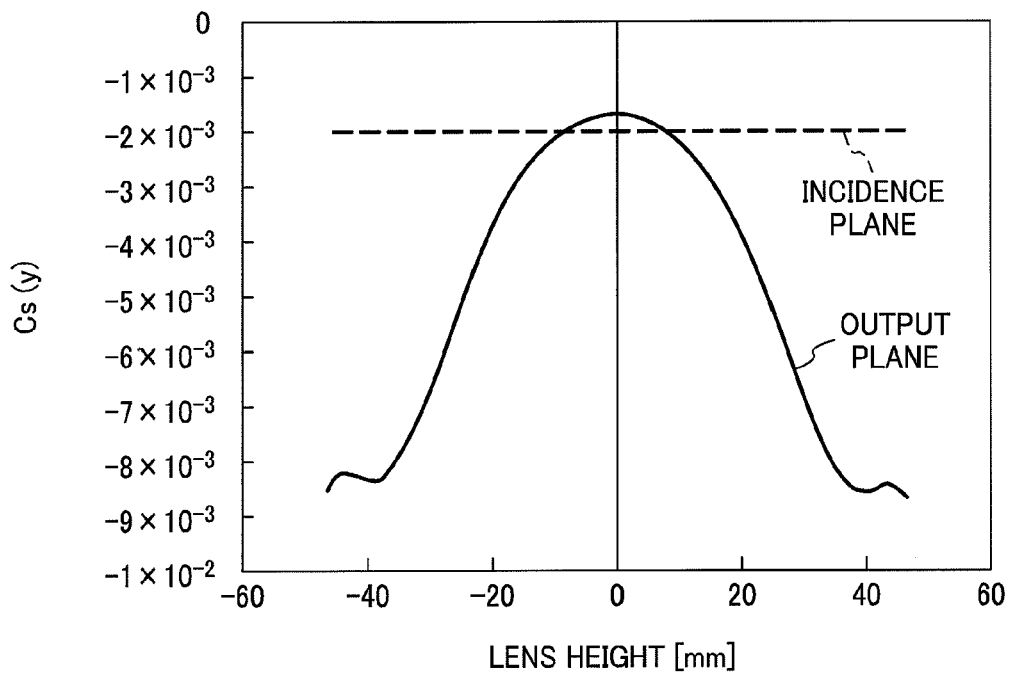
FIG. 15 is a graph (No. 3) for explaining the shape of a deflector-side scanning lens in FIG. 2.
Figure 16:
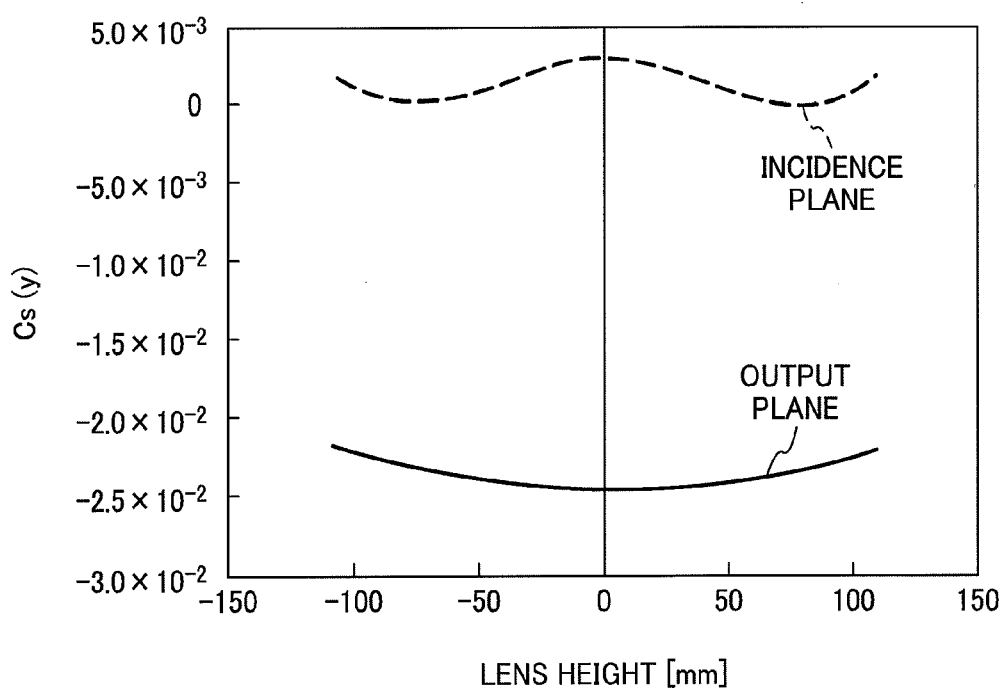
FIG. 16 is a graph (No. 3) for explaining the shape of an image-side scanning lens in FIG. 2.

FIG. 15 is a graph of Cs(Y) on the incidence plane and the output plane of the deflector-side scanning lens 11a that is obtained by substituting the values of FIG. 11 into Expression (2) above. FIG. 16 is a graph of Cs(Y) on the incidence plane and the output plane of the image-side scanning lens 11b that is obtained by substituting the values of FIG. 12 into Expression (2) above.

The thickness of the deflector-side scanning lens 11a at the center (on the optical axis) is 13.5 mm, and thickness of the image-side scanning lens 11b at the center (on the optical axis) is 3.5 mm.

The optical path length between the output plane of the deflector-side scanning lens 11a and the incidence plane of the image-side scanning lens 11b is 89.76 mm, and the optical path length between the output plane of the image-side scanning lens 11b and the surface of the photosensitive drum 1030 is 143.52 mm.

The optical system arranged on the optical path between the polygon mirror 13 and the photosensitive drum 1030 is also called a scanning optical system. In the embodiment, the scanning optical system includes the deflector-side scanning lens 11a and the image-side scanning lens 11b.

Furthermore, dust-tight glass 22 is disposed between the image-side scanning lens 11b and the photosensitive drum 1030.

The so-called sub-scanning lateral magnification of the scanning optical system is ×−0.97. The sub-scanning lateral magnification of the entire optical system is ×1.19, and the main-scanning lateral magnification of the entire optical system is ×4.82. The focal length of the scanning optical system in the direction corresponding to main scanning is 237.8 mm, and the focal length in the direction corresponding to sub-scanning is 71.3 mm.

The writing width (length of the effective scanning area in the main-scanning direction) is 323 mm. The target values of the spot size of the light spot on the surface of the photosensitive drum 1030 are 55 μm in the main-scanning direction and 55 μm in the sub-scanning direction.

Figure 17:
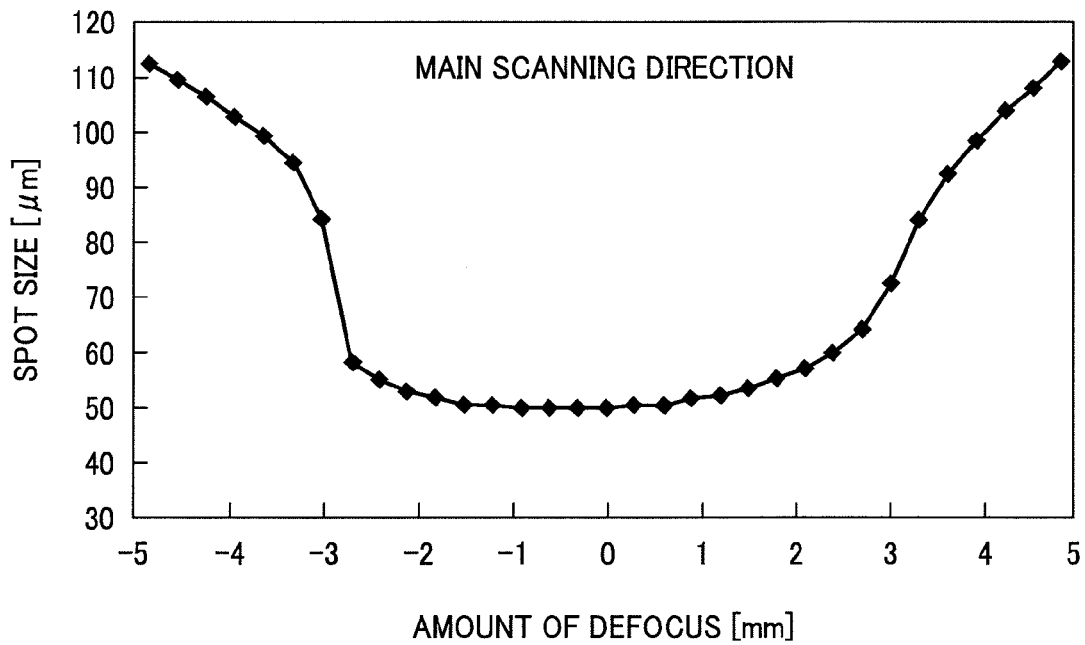
FIG. 17 is a graph for explaining the relationship between the spot size and the amount of defocus in the main-scanning direction.
Figure 18:
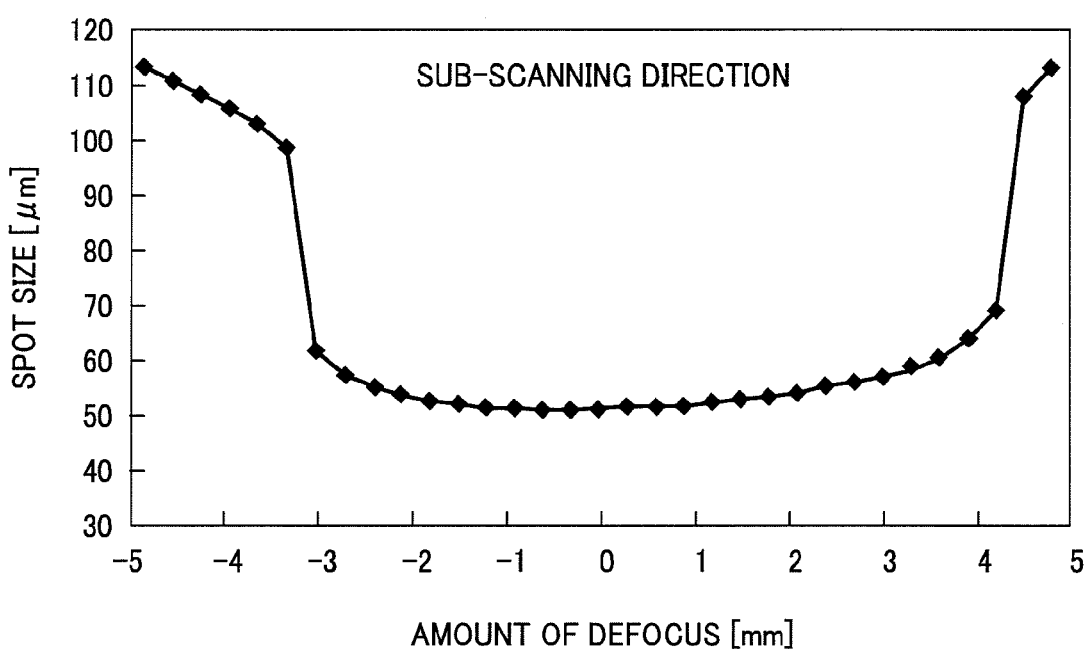
FIG. 18 is a graph for explaining the relationship between the spot size and the amount of defocus in the sub-scanning direction.

FIG. 17 is a graph for explaining the relationship between the amount of defocus on the surface of the photosensitive drum 1030 and the spot size in the main-scanning direction, and FIG. 18 is a graph for explaining the same relationship in the sub-scanning direction. As is apparent from these graphs, the spot size with respect to the amount of defocus is more stable in the sub-scanning direction than in the main-scanning direction.

Figure 19:
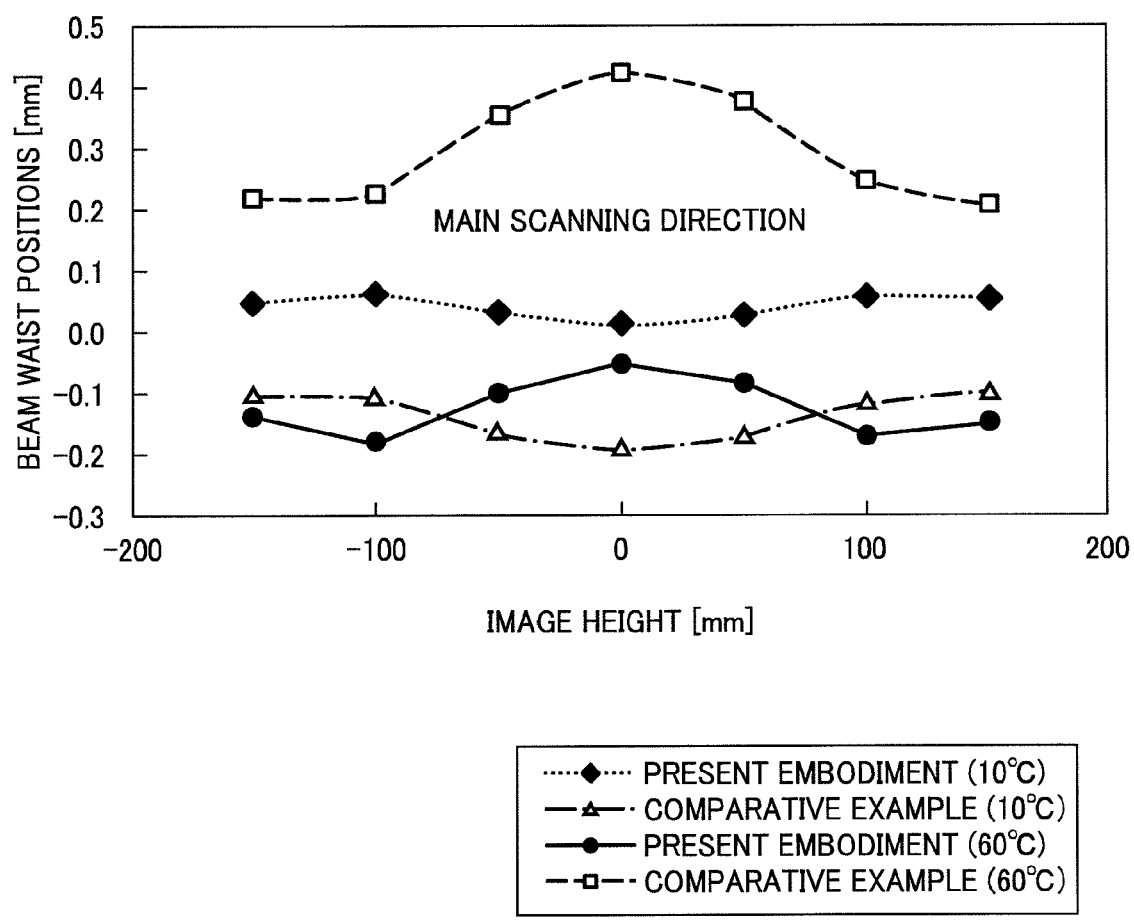
FIG. 19 is a graph for explaining temperature-dependent beam waist positions in the main-scanning direction.
Figure 20:
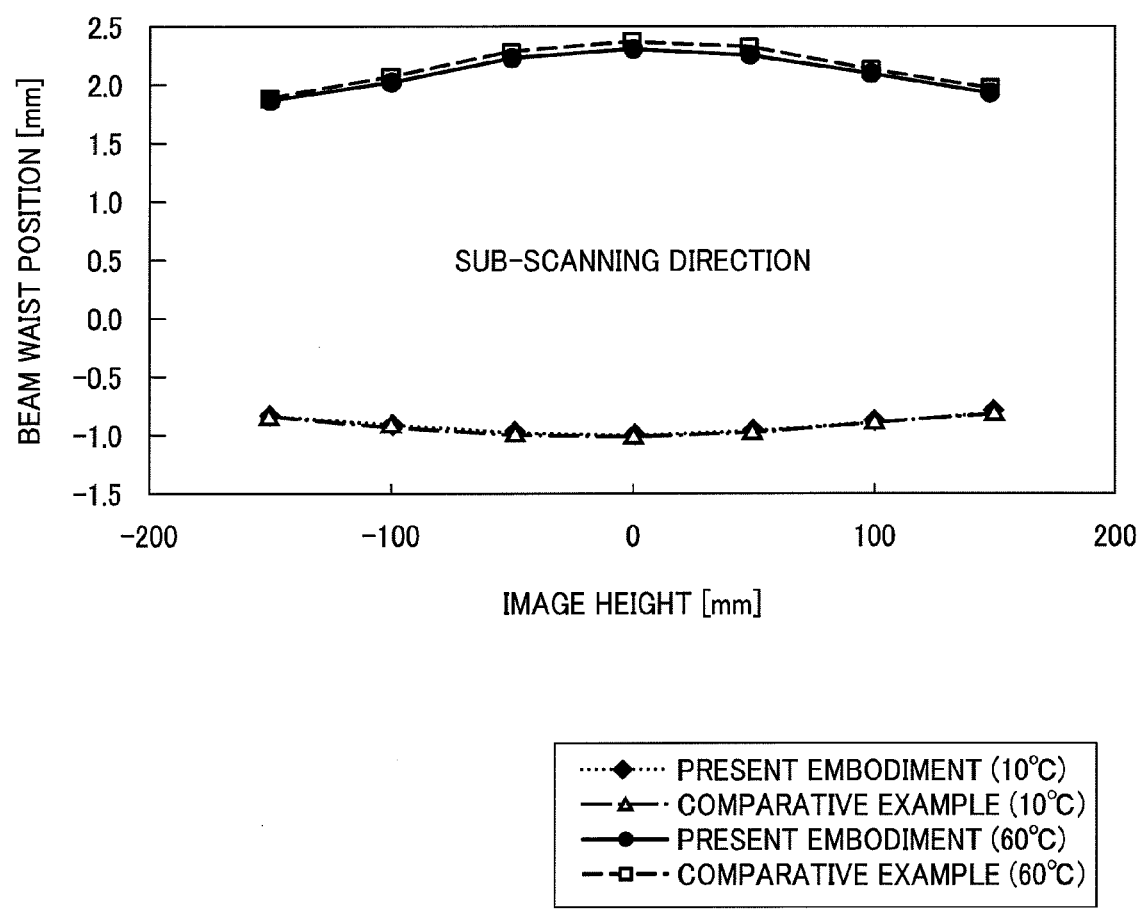
FIG. 20 is a graph for explaining temperature-dependent beam waist positions in the sub-scanning direction.

FIG. 19 is a graph for explaining the beam waist position of the light beam that has passed through the entire optical system in the main-scanning direction when the environmental temperature is low (10° C.) and high (60° C.), and FIG. 20 is a graph for explaining the beam waist position under the same conditions in the sub-scanning direction. In the comparative examples in FIGS. 19 and 20, one known coupling lens made of glass was used in place of the coupling optical system 15 according to the embodiment.

As is apparent from FIG. 19, the amount of change in the beam waist position due to temperature change in the main-scanning direction is smaller in the embodiment than in the comparative example. On the other hand, as is apparent from FIG. 20, the amount of change in the beam waist position in the sub-scanning direction is almost the same in the embodiment and in the comparative example. In this manner, according to the embodiment, the cross-sectional plane of the second lens 15b along the direction corresponding to main scanning is made to have a non-arc shape at the output plane thereof, and the cross-sectional plane of the second lens 15b along the direction corresponding to sub-scanning is made to have an arc shape at the output plane thereof, thereby correcting a change in the beam waist position due to temperature change only in the main-scanning direction. This is because the spot size is more stable with respect to the amount of defocus in the sub-scanning direction than in the main-scanning direction, as described above, and therefore, there is no particular need to perform correction in the sub-scanning direction.

As described above, according to the optical scanning device 1010 of the embodiment, the coupling optical system 15 includes the first lens 15a made of glass having positive power and the second lens 15b made of plastic having negative power. The first lens 15a has a flat surface at the incidence plane and a spherical surface at the output plane, and the cross-sectional plane of the second lens 15b in the direction corresponding to main scanning has a non-arc shape at the output plane.

In this case, because the first lens 15a has a simple surface shape, it can be processed easily and highly accurately even if it is made of glass. Furthermore, because the second lens 15b is made of plastic, it can be manufactured easily and highly accurately at low cost via a standard molding method (e.g., injection molding) even if it has a complicated surface shape. Therefore, both the first lens 15a and the second lens 15b can be realized by low-cost, high-accuracy lenses. As a result, high-accuracy optical scanning can be performed without increasing costs.

In addition, the power of the first lens 15a is larger than the absolute value of the power of the second lens 15b. Because of this, the molding performance of the second lens 15b can be enhanced.

Furthermore, the light source 14 and the coupling optical system 15 are held in a predetermined positional relationship with the holding member 25. As a result, the assembly processes can be simplified. In addition, because the positional relationship among the light source 14, the first lens 15a, and the second lens 15b is defined with high accuracy before other optical components are assembled, the adjustment processes can be simplified. Consequently, the manufacturing costs can be reduced.

The cross-sectional plane of the second lens 15b along the direction in which the front width of the aperture portion of the aperture plate 16 is larger (the direction corresponding to main scanning in the embodiment) has a non-arc shape at the output plane. In other words, the cross-sectional plane of the second lens 15b has a non-arc shape at the output plane thereof in the direction corresponding to main scanning or in the direction corresponding to sub-scanning, whichever has an effective area of larger width. Because of this, correction of aberration can be performed particularly in the direction in which aberration is problematic, thereby enhancing the quality of the light spot and reducing the variation of the light spot intensity.

The cross-sectional plane of the second lens 15b along the direction in which the front width of the aperture portion of the aperture plate 16 is smaller (the direction corresponding to sub-scanning in the embodiment) has an arc shape at the output plane. In other words, the cross-sectional plane of the second lens 15b has an arc shape at the output plane thereof in the direction corresponding to main scanning or in the direction corresponding to sub-scanning, whichever has an effective area of smaller width. As a result, the molding performance for the output plane of the second lens 15b can be enhanced.

In addition, each of the incidence plane and the output plane of the second lens 15b has the same radius of curvature near the optical axis both in the direction corresponding to main scanning and in the direction corresponding to sub-scanning. Because of this, an adverse effect on sensitivity due to a shift (decentering) of the optical axis of the first lens 15a and of the optical axis of the second lens 15b can be decreased.

Furthermore, the first lens 15a has a flat surface at the incidence plane and has a spherical surface at the output plane, whereas the second lens 15b has a flat surface at the incidence plane and has an aspherical surface at the output plane. Because of this, reflected light from the second lens 15b can be prevented from returning to the light source 14.

In addition, the light source 14 includes a surface-emitting laser array having a plurality of light-emitting units arranged thereon two-dimensionally, and the first lens 15a and the second lens 15b are positionally adjusted in the direction parallel to the light beam output direction such that the combined focal length of both the lenses has a desired value. Because of this, variation of the spot size across a plurality of light spots and variation of scanning-line spacing on the surface of the photosensitive drum 1030 can be reduced easily.

According to the embodiment, because the first lens 15a and the second lens 15b are bonded to the holding member 25 after adjustment, the light-source unit LU does not include a positioning portion that indicates the mounting positions of the first lens 15a and the second lens 15b. As a result, the shape of the light-source unit LU can be simplified, which contributes to reductions in cost and space. Furthermore, because a large working space can be secured at the time of adjustment, adjustment can be performed with higher accuracy.

Because the laser printer 1000 according to the embodiment includes the optical scanning device 1010 capable of high-accuracy optical scanning without increasing costs, high-quality images can be formed without increasing costs.

Although the embodiment above has been described assuming that the positional relationship among the light source 14, the first lens 15a, and the second lens 15b is adjusted before other optical components are assembled, the present invention is not limited to this assembly order. The positional relationship among the light source 14, the first lens 15a, and the second lens 15b may be adjusted after other optical components have been assembled. By doing so, processing errors and assembly errors of the optical system can be offset.

Figure 21A:
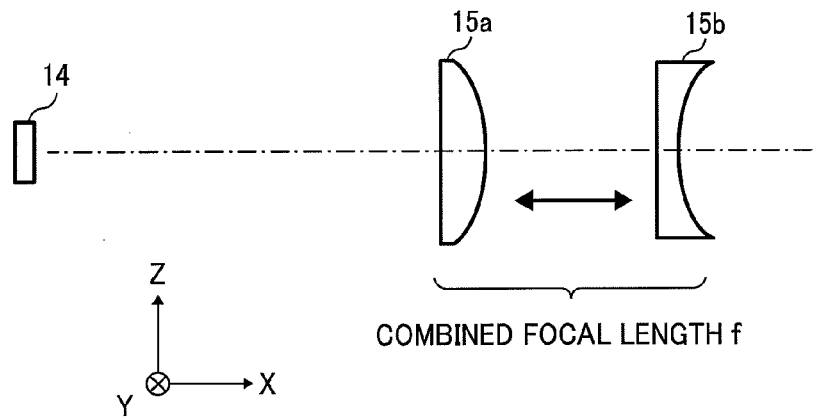
FIGS. 21A and 21B are diagrams of a modified adjustment procedure for a coupling optical system.
Figure 21B:
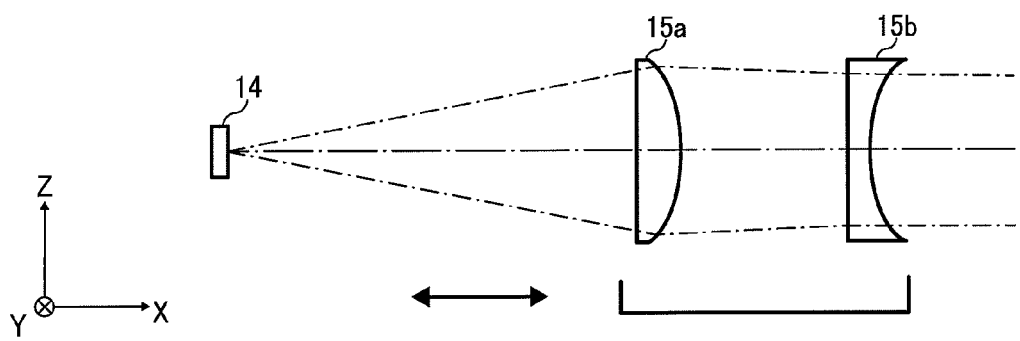

Although, in the section "Adjustment of the coupling optical system" according to the embodiment described above, the lateral magnification in the direction corresponding to sub-scanning is adjusted after the focal position has been adjusted, the present invention is not limited to this adjustment order. For example, the distance (reference symbol D2 in FIG. 4) between the first lens 15a and the second lens 15b may be adjusted first (refer to FIG. 21A) so that the beam pitch on the test image plane of the light-source-unit testing apparatus AD2 exhibits a desired value, and then the coupling optical system 15 may be moved in the X-axis direction (refer to FIG. 21B) so that each light beam is focused on the test image plane of the light-source-unit testing apparatus AD1 while maintaining the adjusted distance D2 between the first lens 15a and the second lens 15b.

In this case, there is risk of changing the lateral magnification in the direction corresponding to sub-scanning when the coupling optical system 15 is moved. However, because the power of the first lens 15a is larger than the absolute value of the power of the second lens 15b, a change in the lateral magnification in the direction corresponding to sub-scanning is very small.

Figure 22:
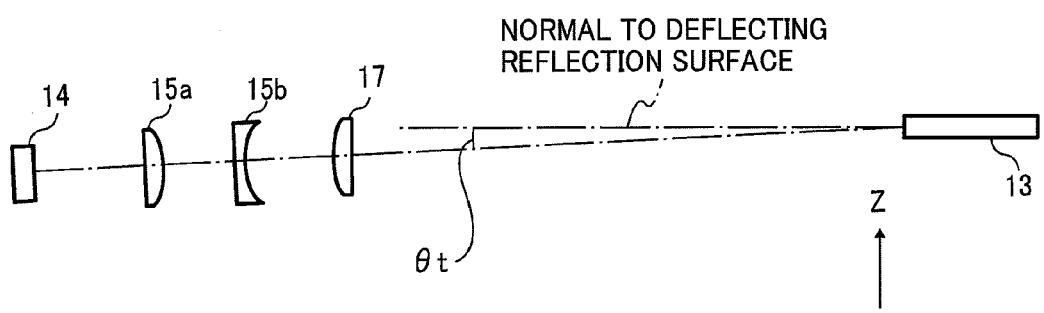
FIG. 22 is a diagram of a light beam obliquely incident upon a polygon mirror.

In addition, in the embodiment described above, for example, as shown in FIG. 22, the principal ray direction of the light beam that is incident upon the deflecting reflection surface may be tilted relative to the normal direction of the deflecting reflection surface in the direction corresponding to sub-scanning. By doing so, reflected light (stray light) from the scanning lens can be prevented from reaching the photosensitive drum 1030.

In this case, the deflector-side scanning lens and the image-side scanning lens having an optical surface shape represented by Expressions (3) and (4) below can be used. In Expressions (3) and (4) below, X is a coordinate in the optical-axis direction, and Y is a coordinate in the direction corresponding to main scanning. Furthermore, Cm indicates the curvature in the direction corresponding to main scanning at the center (Y=0), which is the reciprocal of the radius of curvature $R_n y$. $A_n$ to $E_n$, $F_2$ to $F_{10}$, and $a_n$ to $f_n$ are coefficients. Cs(Y) is the curvature at the coordinate Y in the direction corresponding to sub-scanning.

$$X_n(Y, Z) = \frac{Y \cdot Cm}{1 + \sqrt{1 - (1 + K_n) \cdot (Y \cdot Cm)^2}} + A_n \cdot Y^4 + B_n \cdot Y^6 + C_n \cdot Y^8 + D_n \cdot Y^{10} + E_n \cdot Y^{12} + \frac{Cs(Y) \cdot Z^2}{1 + \sqrt{1 - (Cs(Y) \cdot Z)^2}} + (F_2 \cdot Y^2 + F_4 \cdot Y^4 + F_6 \cdot Y^6 + F_8 \cdot Y^8 + F_{10} \cdot Y^{10}) \cdot Z \quad (3)$$

$$Cs(Y) = \frac{1}{R_n z} + a_n Y^2 + b_n Y^4 + c_n Y^6 + d_n Y^8 + e_n Y^{10} + f_n Y^{12} \quad (4)$$

FIGS. 23 and 24 are tables showing one example of values of $R_n y$ (units: mm), $R_n z$ (units: mm), and coefficients on each surface (incidence plane and output plane) of each of the scanning lenses.

Although the embodiment above has been described assuming that the light source includes 40 light-emitting units, the number of light-emitting units is not limited to 40 in the present invention.

Furthermore, although the embodiment above has been described assuming that the first lens 15a has a flat surface at the incidence plane and a spherical surface at the output plane, the first lens 15a is not limited to this configuration in the present invention. In short, the requirement for the first lens 15a is that one of the incidence plane and the output plane be a spherical surface and the other be a spherical or flat surface.

In addition, although the embodiment above has been described assuming that the cross-sectional plane of the second lens 15b in the direction corresponding to main scanning has a non-arc shape at the output plane, the present invention is not limited to this configuration. For example, if the longitudinal direction of the aperture portion of the aperture plate 16 coincides with the direction corresponding to sub-scanning, the cross-sectional plane of the second lens 15b may have a non-arc shape along the direction corresponding to sub-scanning.

Furthermore, the embodiment above has been described assuming that the cross-sectional plane of the second lens 15b along the direction corresponding to main scanning has a non-arc shape at the output plane thereof, and the cross-sectional plane of the second lens 15b along the direction corresponding to sub-scanning has an arc shape at the output plane thereof. However, the present invention is not limited to this configuration. The cross-sectional plane of the second lens 15b along both the directions may have a non-arc shape at the output plane.

In addition, although the embodiment above has been described assuming that the second lens 15b has a flat surface at the incidence plane and has an aspherical surface at the output plane, the present invention is not limited to this configuration. For example, as long as reflected light from the second lens 15b does not adversely affect the light source 14, the incidence plane may be an aspherical surface and the output plane may be a flat surface. Furthermore, both the incidence plane and the output plane may be aspherical surfaces.

In addition, according to the embodiment described above, each of the scanning lenses may be made of plastic to reduce the cost. However, if a drastic change in environmental temperature is expected in this case, at least one optical surface may be provided with a diffraction grating to reduce the effect of the temperature change.

Although the embodiment above has been described assuming that the image forming apparatus is realized by the laser printer 1000, the image forming apparatus is not limited to a laser printer. In short, any image forming apparatus including the optical scanning device 1010 can form high-quality images stably without increasing costs.

For example, an image forming apparatus, including the optical scanning device 1010 described above, in which media that develop color with a laser beam (e.g., paper sheet) are irradiated directly with a laser beam is also acceptable.

Furthermore, an image forming apparatus in which silver-halide film is used as the image bearing member is also acceptable. In this case, a latent image is formed on the silver-halide film by optical scanning, and the latent image can be visualized through processing similar to a development process of the normal silver-halide photographic process. Thereafter, the visualized image can be transferred to printing paper through processing similar to printing of the normal silver-halide photographic process. Such an image forming apparatus can be realized as a photo-platemaking apparatus or a photo-imaging apparatus that produces, for example, CT scan images.

Figure 25:
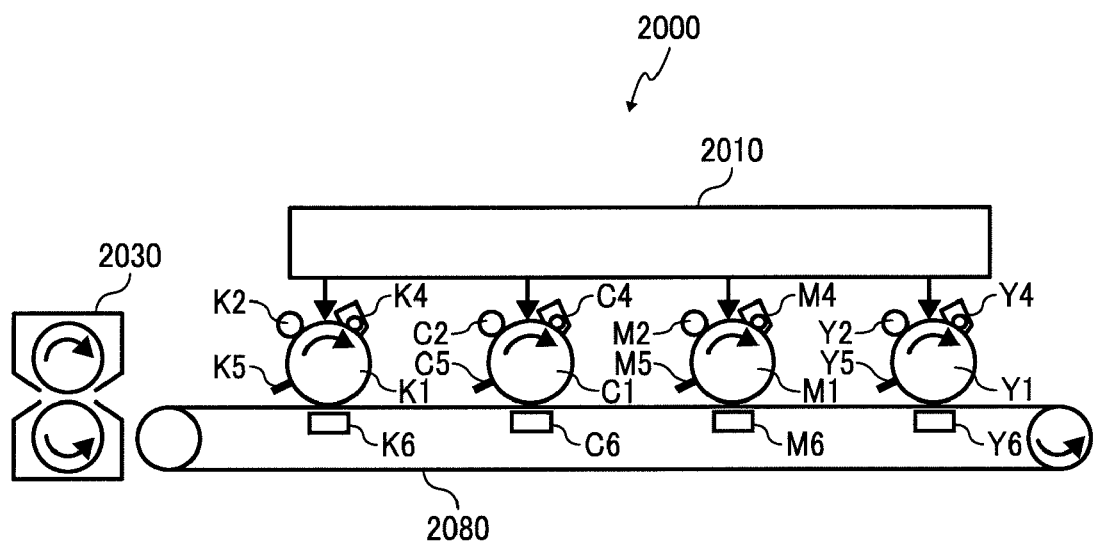
FIG. 25 is a schematic diagram of an exemplary structure of a color printer.

For example, a color printer 2000 including a plurality of photosensitive drums is also acceptable, as shown in FIG. 25.

The color printer 2000 is a tandem multi-color printer that forms full-color images by overlapping four colors (black, cyan, magenta, and yellow). The color printer 2000 includes a photosensitive drum K1, a charging apparatus K2, a developing apparatus K4, a cleaning unit K5, and a transfer apparatus K6 for black; a photosensitive drum C1, a charging apparatus C2, a developing apparatus C4, a cleaning unit C5, and a transfer apparatus C6 for cyan; a photosensitive drum M1, a charging apparatus M2, a developing apparatus M4, a cleaning unit M5, and a transfer apparatus M6 for magenta; a photosensitive drum Y1, a charging apparatus Y2, a developing apparatus Y4, a cleaning unit Y5, and a transfer apparatus Y6 for yellow; an optical scanning device 2010; a conveyor belt 2080; a fixing unit 2030; and so forth.

Each of the photosensitive drums rotates in the direction indicated by the corresponding arrow in FIG. 25. Around each of the photosensitive drums, a charging apparatus, a developing apparatus, a transfer apparatus, and a cleaning unit are arranged along the rotational direction. Each of the charging apparatuses uniformly charges the surface of the corresponding photosensitive drum. The surface of each of the photosensitive drums charged by the charging apparatus is irradiated with light from the optical scanning device 2010, and an electrostatic latent image is formed on each of the photosensitive drums. Thereafter, a toner image is formed on the surface of each of the photosensitive drums by the corresponding developing apparatus. Furthermore, a toner image of each color is transferred onto a recording sheet by the corresponding transfer apparatus, and finally an image is fixed on the recording sheet by the fixing unit 2030.

The optical scanning device 2010 includes a light source similar to the light sources 14 described above, a pre-deflector optical system similar to the pre-deflector optical system described above, and a scanning optical system similar to the scanning optical system described above, for each color. Therefore, the same advantages as those of the optical scanning device 1010 can be afforded.

The light beam emitted from each of the light sources is deflected by the common polygon mirror via the corresponding deflector-front optical system and is emitted to the corresponding photosensitive drum via the corresponding scanning optical system.

Therefore, the color printer 2000 can afford advantages similar to those of the laser printer 1000 described above.

In the color printer 2000, the optical scanning devices may be provided one for each color or one for each set of two colors.

According to the first aspect, the first optical system that couples the light beam from the light source includes the first lens made of glass having positive power and the second lens made of plastic having negative power. The first lens has a spherical surface at one of the incidence plane and the output plane and has a spherical or flat surface at the other. The cross-sectional plane of the second lens has a non-arc shape at at least one of the incidence plane and the output plane along either the direction corresponding to the main-scanning direction or the direction corresponding to the sub-scanning direction. In this case, because the first lens has a simple surface shape, it can be processed easily and highly accurately even if it is made of glass. Furthermore, because the second lens is made of plastic, it can be manufactured by a standard molding method (e.g., injection molding) easily and accurately, as well as at low-cost, even if it has a complicated surface shape. Therefore, both the first lens and the second lens can be realized by low-cost, high-accuracy lenses. As a result, high-accuracy optical scanning can be performed without increasing costs.

Furthermore, according to another aspect of the present invention, because at least one optical scanning device according to the present invention is provided, a high-quality image can be formed without incurring high costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface with a light beam in a main-scanning direction, the optical scanning device comprising:
   a light source that emits the light beam;
   a first optical system that couples the light beam from the light source, the first optical system including a first lens made of glass having a positive power and a second lens made of plastic having a negative power at least along a direction corresponding to the main-scanning direction; and
   a second optical system that focuses the light beam from the first optical system onto the scanning surface and moves a light spot obtained by focusing the light beam on the scanning surface in the main-scanning direction,
   wherein one of an incidence plane and an output plane of the first lens is spherical while other of the incidence plane and the output plane is spherical or flat,
   wherein a cross-sectional plane of the second lens at least along the direction corresponding to the main-scanning direction has a non-arc shape on at least one of an incidence plane and an output plane of the second lens, and
   wherein the power of the first lens is larger than the power of the second lens in magnitude.

2. The optical scanning device according to claim 1, wherein each of the incidence plane and the output plane of the second lens has substantially a same radius of curvature near an optical axis both in a first direction and in a second direction.

3. The optical scanning device according to claim 1, wherein an incidence plane of the first lens is flat while an output plane of the first lens is spherical, and the incidence plane of the second lens is flat while the output plane of the second lens is aspherical.

4. The optical scanning device according to claim 1, wherein the light source includes a plurality of light-emitting units arranged in two-dimensional array, and at least one of the first lens and the second lens is positionally adjusted along a direction parallel to an output direction of the light beam from the light source such that a combined focal length of the first lens and the second lens meets a predetermined value.

5. The optical scanning device according to claim 4, wherein the light-emitting units are surface-emitting lasers formed on a substrate.

6. The optical scanning device according to claim 1, further comprising a holding member that holds the light source and the first optical system in a predetermined positional relationship.

7. An image forming apparatus comprising:
   at least one image carrier; and
   at least one optical scanning device that scans the at least one image carrier with a light beam modulated according to image information, the optical scanning device including
   a light source that emits the light beam,
   a first optical system that couples the light beam from the light source, the first optical system including a first lens made of glass having a positive power and a second lens made of plastic for receiving the light beam from said first lens, and wherein said second lens has a negative power at least along a direction corresponding to the main-scanning direction, such that said second lens collimates the light beam at least with respect to a sub-scanning direction, and wherein the sub-scanning direction is perpendicular to the main-scanning direction, and a second optical system that focuses the light beam from the first optical system onto the scanning surface and moves a light spot obtained by focusing the light beam on the scanning surface in the main-scanning direction, wherein one of an incidence plane and an output plane of the first lens is spherical while other of the incidence plane and the output plane is spherical or flat, wherein a cross-sectional plane of the second lens at least along the direction corresponding to the main-scanning direction has a non-arc shape on at least one of an incidence plane and an output plane of the second lens, and wherein the power of the first lens is larger than the power of the second lens in magnitude.

8. The image forming apparatus according to claim 7, wherein the image information is color image information.

* * * * *